(12) United States Patent
Peschel et al.

(10) Patent No.: US 9,829,056 B2
(45) Date of Patent: Nov. 28, 2017

(54) ARRANGEMENT OF A PAD RETAINING CLIP ON THE BRAKE CALIPER OF A DISC BRAKE, AND BRAKE PAD

(71) Applicant: KNORR-BREMSE Systeme Fuer Nutzfahrzeuge GmbH, Munich (DE)

(72) Inventors: Michael Peschel, Schoengeising (DE); Alexander Asen, Eichendorf (DE); Christian Stoeger, Vilshofen (DE); Matthias Klingner, Moorenweis (DE); Christian Brandl, Plattling (DE); Alexander Werth, Munich (DE); Abdelaziz Rguichi, Olching (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/658,546

(22) Filed: Mar. 16, 2015

(65) Prior Publication Data

US 2015/0184710 A1    Jul. 2, 2015

Related U.S. Application Data (63) Continuation of application No. PCT/EP2013/069120, filed on Sep. 16, 2013.

(30) Foreign Application Priority Data

Sep. 17, 2012   (DE) .......................... 10 2012 108 667

(51) Int. Cl.
*F16D 65/097* (2006.01)
*F16D 65/00* (2006.01)
(Continued)

(52) U.S. Cl.
CPC ....... *F16D 65/0068* (2013.01); *F16D 55/225* (2013.01); *F16D 65/092* (2013.01);
(Continued)

(58) Field of Classification Search
CPC .... F16D 55/225; F16D 65/095; F16D 65/092; F16D 65/0977; F16D 65/0978; F16D 65/0974
(Continued)

(56) References Cited

U.S. PATENT DOCUMENTS 4,082,166 A * 4/1978 Ritsema .............. F16D 65/0979
                                                        188/73.32
4,498,564 A    2/1985 Tamura
(Continued)

FOREIGN PATENT DOCUMENTS

CN  101755143 A   6/2010
DE  86 15 015 U1  10/1987
(Continued)

OTHER PUBLICATIONS

International Preliminary Report on Patentability (PCT/IB/326 & PCT/IB/373), including Written Opinion (PCT/ISA/237) dated Mar. 26, 2015 with English-language translation (thirteen (13) pages).
(Continued)

*Primary Examiner* — Thomas Irvin
(74) *Attorney, Agent, or Firm* — Crowell & Moring LLP (57) ABSTRACT

A disk brake includes a brake caliper and two brake pads, which can be pressed onto a brake disk on both sides and which each have a pad carrier plate and a friction pad fastened thereto. A pad retaining clip, which is retained on the brake caliper and which spans an installation opening, is supported on the brake pads. The pad retaining clip is fastened to a form closure element of at least one brake pad so as to be secured against movement.

17 Claims, 5 Drawing Sheets

(51) Int. Cl.
   *F16D 55/225* (2006.01)
   *F16D 65/092* (2006.01)
   *F16D 65/095* (2006.01)
   *F16D 55/00* (2006.01)

(52) U.S. Cl.
   CPC ....... *F16D 65/095* (2013.01); *F16D 65/0977* (2013.01); *F16D 65/0978* (2013.01); *F16D 65/0974* (2013.01); *F16D 2055/0016* (2013.01); *F16D 2250/0084* (2013.01)

(58) Field of Classification Search
   USPC ............................... 188/73.31, 73.32, 73.38
   See application file for complete search history.

(56) References Cited

U.S. PATENT DOCUMENTS

| | | | | |
|---|---|---|---|---|
| 4,560,037 | A * | 12/1985 | Gumkowski | F16D 55/227 188/73.38 |
| 4,773,511 | A | 9/1988 | Giering et al. | |
| 7,438,161 | B2 * | 10/2008 | Burgoon | F16D 65/0043 188/73.32 |
| 7,458,447 | B2 * | 12/2008 | Thomas | F16D 55/226 188/205 A |
| 7,837,015 | B2 * | 11/2010 | Klement | F16D 65/0977 188/73.35 |
| 8,016,084 | B2 | 9/2011 | Camilo-Martinez et al. | |
| 8,443,946 | B2 | 5/2013 | Saito et al. | |
| 8,496,093 | B2 * | 7/2013 | Kreuzeder | F16D 65/0976 188/1.11 L |
| 8,662,261 | B2 | 3/2014 | Raffin et al. | |
| 8,820,488 | B2 * | 9/2014 | Klement | F16D 65/0977 188/71.1 |
| 2006/0151262 | A1 * | 7/2006 | Baumgartner | F16D 65/18 188/72.9 |
| 2006/0260885 | A1 * | 11/2006 | Maehara | F16D 65/0972 188/71.1 |
| 2008/0067016 | A1 * | 3/2008 | Pritz | F16D 55/225 188/73.38 |
| 2008/0264739 | A1 * | 10/2008 | Pritz | F16D 65/0043 188/73.31 |
| 2009/0236188 | A1 * | 9/2009 | Raffin | F16D 65/0974 188/73.31 |
| 2011/0005872 | A1 * | 1/2011 | Baumgartner | F16D 65/0978 188/73.31 |

FOREIGN PATENT DOCUMENTS

| | | |
|---|---|---|
| DE | 39 38 881 A1 | 5/1991 |
| DE | 10 2006 051 965 A1 | 5/2007 |
| DE | 10 2005 052 436 B3 | 8/2007 |
| DE | 10 2006 002 306 A1 | 8/2007 |
| DE | 10 2006 039 298 B3 | 4/2008 |
| DE | 10 2007 049 979 A1 | 4/2009 |
| DE | 10 2007 046 945 A1 | 5/2009 |
| EP | 2 184 506 A1 | 5/2010 |
| JP | 05-056732 | 7/1993 |
| SU | 1666829 A2 | 7/1989 |
| WO | WO 2007/051614 A1 | 5/2007 |
| WO | WO 2007/068464 A1 | 6/2007 |

OTHER PUBLICATIONS

German Office Action dated Apr. 18, 2013 (Eight (8) pages).
International Search Report (PCT/ISA/210) dated Dec. 10, 2013 with English-language translation (Six (6) pages).
Chinese-language Office Action issued in counterpart Chinese Application No. 201380055664.1 dated Aug. 11, 2016 with English translation (11 pages).
Chinese Office Action issued in counterpart Chinese Application No. 201380055664.1 dated Feb. 22, 2017 with English translation (Ten (10) pages).
Russian Office Action dated Sep. 22, 2017 (Seven (7) pages).
Japanese Office Action issued in counterpart Japanese Application No. 2015-531587 dated Aug. 29, 2017 with English translation (Nine (9) pages).

* cited by examiner

ARRANGEMENT OF A PAD RETAINING CLIP ON THE BRAKE CALIPER OF A DISC BRAKE, AND BRAKE PAD

CROSS REFERENCE TO RELATED APPLICATIONS

This application is a continuation of PCT International Application No. PCT/EP2013/069120, filed Sep. 16, 2013, which claims priority under 35 U.S.C. §119 from German Patent Application No. 10 2012 108 667.2, filed Sep. 17, 2012, the entire disclosures of which are herein expressly incorporated by reference.

BACKGROUND AND SUMMARY OF THE INVENTION

The invention relates to the arrangement of a pad retaining clip on the brake caliper of a disk brake and to a brake pad for a disk brake.

The arrangement of a pad retaining clip on the brake caliper of a disk brake is known, for example, from DE 10 2006 039 298 B3. Here, the pad retaining clip serves to prestress brake pads in order to avoid rattling noise, for example. The brake pads are arranged in the brake caliper and, in each case, have a pad retaining spring which is fastened to a pad carrier plate and by which, in correspondence with the pad retaining clip, the brake pads are held in the brake caliper under prestress.

According to WO 2007/068464 A1, a pad retaining spring of this type is fastened by way of a cover to the pad carrier plate. To be precise, it is fastened in such a way that the pad retaining spring can be moved in the radial direction. Here, the pad retaining clip is supported on the cover which is connected to the pad retaining spring.

The previously known proposals for fastening the pad retaining clip to the brake caliper are not suitable in the desired way, however, to correspond to the requirements for simple installation and removal of the brake pads, in particular during a brake pad change.

It is thus proposed, for example, in DE 86 15 015 U1 to firstly hold the pad retaining clip on the brake caliper in a positively locking manner and, secondly, to screw it to the brake caliper. This type of fastening of the pad retaining clip is naturally possible only with considerable outlay, both in terms of the preparation of corresponding measures, such as the introduction of a threaded bore into the brake caliper, and also with regard to the assembling and dismantling. Here, the constricted spatial conditions of an assembled disk brake are to be taken into consideration which make the assembly work additionally difficult.

However, the structural solutions, in which the use of connecting means is dispensed with and which instead propose different elements, in particular positively locking elements, are also not suitable for contributing to an optimization of the assembly work.

The invention is based on the object of developing an arrangement and a pad retaining clip of the above-mentioned type in such a way that simple and inexpensive assembly and removal of brake pads is possible in order to minimize the manufacturing costs of the measures which are necessary for fastening the pad retaining clip.

This and other objects are achieved by way of an arrangement of a pad retaining clip on the brake caliper of a disk brake. Two brake pads which can be pressed onto a brake disk on both sides, and which each have a pad carrier plate and a friction pad fastened thereto, and arranged in the brake caliper. The pad retaining clip is held on the brake caliper and spans an assembly opening. The pad retaining clip is fastened to a positively locking element of at least one brake pad such that it is secured against being displaced.

In comparison with an arrangement according to the prior art, the novel arrangement affords considerable advantages, in particular with regard to cost minimization which results firstly from the structurally simple construction of the arrangement or the pad retaining clip and the associated inexpensive production, and secondly from the substantially simplified handling in comparison with the prior art with regard to assembly and dismantling of the pad retaining clip and therefore of the brake pads.

Here, the novel arrangement is distinguished by a particular robustness and by reliable fastening of the pad retaining clip to the brake caliper which is absolutely reliable even in the case of the greatest possible loading during driving operation of the preferably commercial vehicle.

In order to realize the positively locking connection, the pad retaining clip has a window opening, into which a positively locking element of the brake pad engages in such a way that the pad retaining clip is secured against being displaced.

In one design variant of the invention, the pad retaining clip is latched to the pad retaining spring, to which end said pad retaining spring has correspondingly formed latching elements.

This is likewise provided in another embodiment of the brake pad, in which the pad retaining spring has a cover which is connected to it and onto which the latching element, which is in engagement with the pad retaining clip, is formed.

If the pad retaining spring is dispensed with, as is likewise known from the prior art, but also if the pad retaining spring is used, the positively locking element can be fastened to the pad carrier plate or can be configured in one piece with the latter.

According to one advantageous development of the invention, positively locking elements are likewise provided on the brake caliper, into which positively locking elements the pad retaining clip engages in an end position. The positively locking elements are arranged in the edge regions of an assembly opening of the brake caliper which lie opposite one another and are spanned by the pad retaining clip. In this way, additional securing of the pad retaining clip as it were in all directions is achieved.

Since the brake caliper is usually composed of cast iron, the positively locking elements of the brake caliper can be formed integrally on it, with the result that this can take place practically in a cost-neutral manner.

Cost-neutral production of the pad retaining clip is likewise possible, since it is produced as a sheet metal shaped part by way of punching, just like the pad retaining spring or the cover which has positively locking elements which correspond with the pad retaining clip in one design variant.

According to a further aspect of the invention, the positively locking elements can consist of at least one latching tongue which passes through a window opening of the retaining clip and bears against a wall of the window opening in such a way that a displacement of the retaining clip in the axial direction is ruled out.

The latching tongue is formed on the pad retaining spring, which is configured as a leaf spring, or on the cover, which makes simple and extremely inexpensive production possible. A latching tongue of this type can also be attached to the pad carrier plate or can be configured in one piece with the latter.

Two latching tongues are preferably provided which bear against the walls of the window opening which lie opposite one another in the longitudinal axial direction of the retaining clip. The two latching tongues run parallel to and at a spacing from one another and are elastically deformable for plugging into or for pressing out of the window opening.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
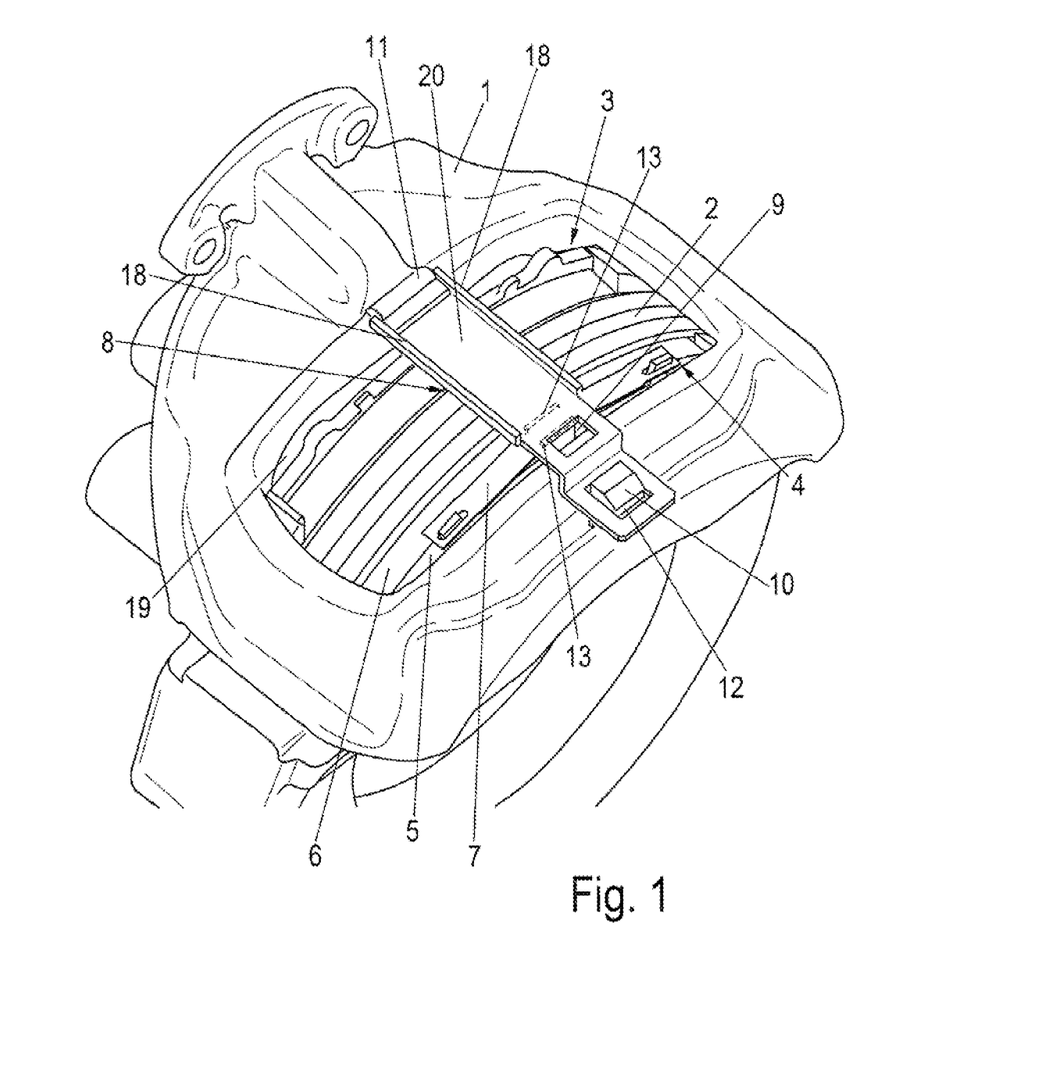
FIG. 1 is a schematic perspective view of an arrangement of a pad retaining clip in a first position.
Figure 2:
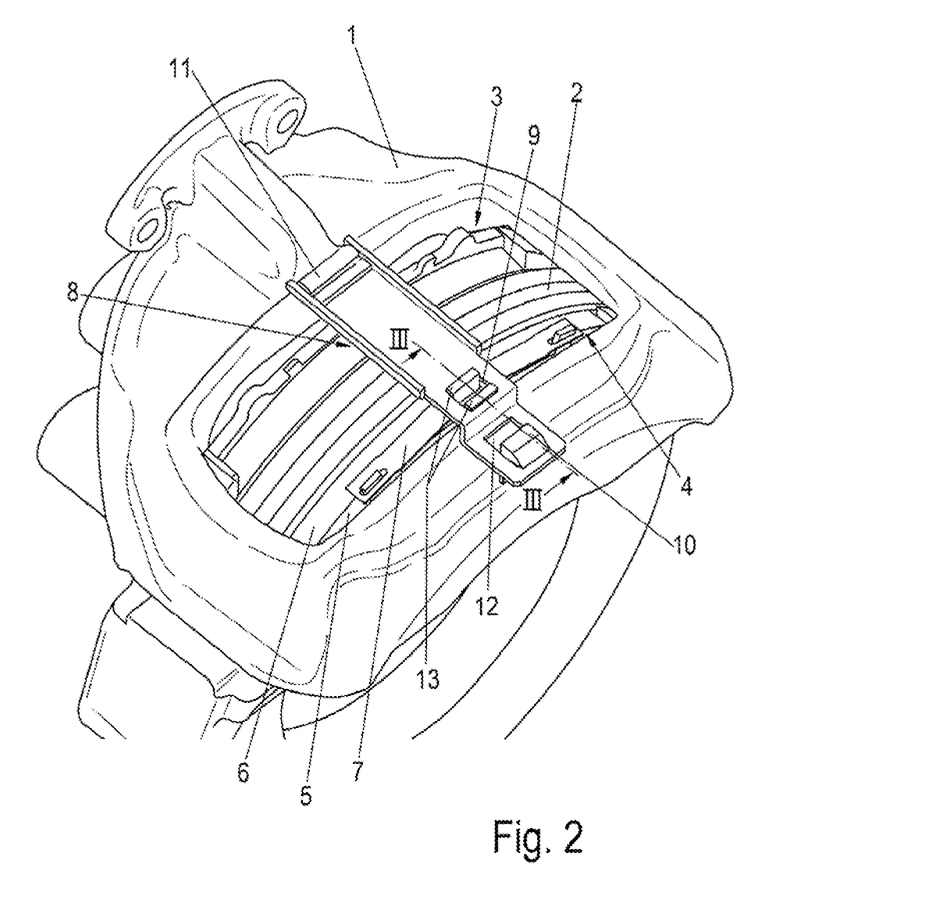
FIG. 2 is a schematic perspective view of an arrangement of the pad retaining clip in a second position.

FIGS. 1 and 2 in each case show a sliding caliper disk brake for a commercial vehicle, having a brake caliper 1, on which two brake pads 3, 4 are arranged which in each case make contact on both sides of a brake disk 2 in the case of a braking operation. Each brake pad 3, 4 has a pad carrier plate 5 and, on the side which faces the brake disk 2, a friction pad 6 which is connected to the pad carrier plate 5.

A pad retaining spring 7 in the form of a leaf spring is fastened to each pad carrier plate 5, on which pad retaining spring 7 a pad retaining clip 8 is supported. The pad retaining clip 8 spans an assembly opening 19 of the brake caliper 1 and is held on the brake caliper 1 on both sides at the edge of the assembly opening 19.

The brake pad 3 is pressed against the brake disk 2 by means of a brake application device (not shown), while the reaction-side brake pad 4, which lies opposite, bears against the rear wall of the brake caliper 1.

In order to fasten the retaining clip 8 to the brake caliper 1, a holder 11 is formed on the caliper at the application brake pad 3 side, and a latching lug 10 is preferably formed on the opposite side on the brake caliper 1 which is composed of cast iron.

According to the invention, the pad retaining clip 8 is fastened to the brake pad 4 by way of a positively locking connection such that it is secured against being displaced.

To this end, the pad retaining clip 8 has a window opening 9. In the functional position of the pad retaining clip 8, in this example, two latching tongues 13 which are arranged parallel to and at a spacing from one another and are arranged on the pad retaining spring 7 or a cover 17 (FIGS. 3 and 4) pass through the window opening 9. The latching tongues 13 extend transversely with respect to the longitudinal extent of the pad retaining clip 8.

FIG. 1 shows the start of the assembly of the retaining clip 8, whereas FIG. 2 illustrates the assembled and, therefore, latched position.

In order to assemble the retaining clip 8, it is placed onto the pad retaining springs 7, from which the latching tongues 13 extend upward, and is pressed downward counter to the force of the pad retaining spring 7. In FIG. 1, the latching tongues 13 are indicated bearing against the underside of the retaining clip 8 in this position. Here, the latching hook 10 passes through an aperture 12 of the pad retaining clip 8, whereas the opposite end is in congruence with an introduction slot (not shown) of the holder 11.

After the pad retaining spring 7 is pressed down, the pad retaining clip 8 is displaced in the direction of the holder 11 until the latching tongues 13 pass into the open region of the window opening 9 and a front-side web of the pad retaining clip 8 dips into an undercut 14 of the latching lug 10 as shown in FIG. 2.

Figure 3:
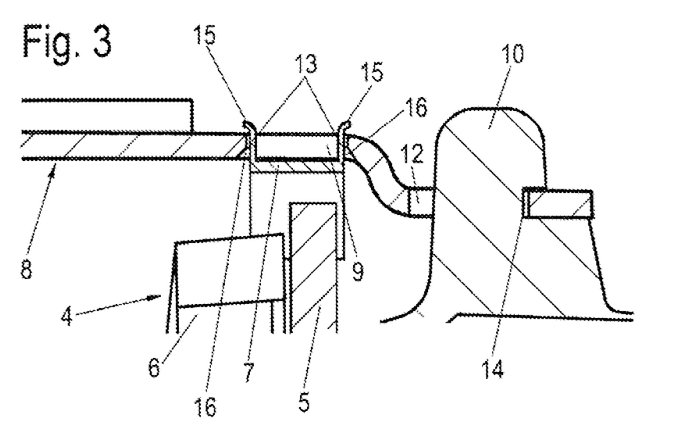
FIG. 3 shows a part detail of the arrangement in a sectioned side view according to the line III-III in FIG. 2.
Figure 4:
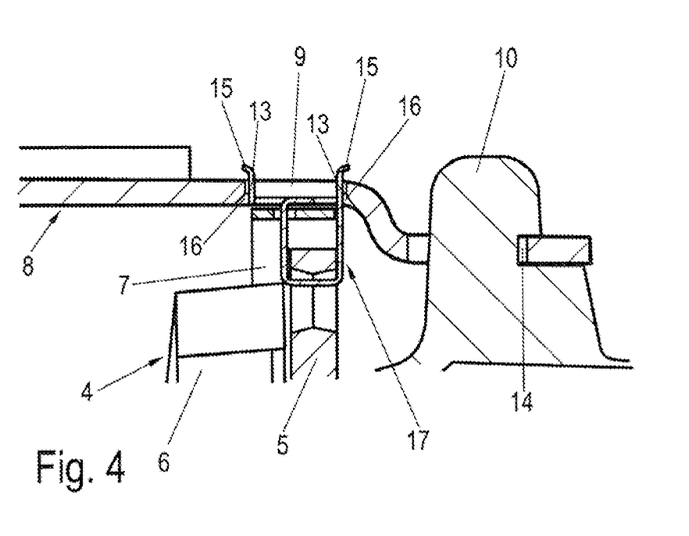
FIG. 4 shows a further exemplary embodiment of the invention, likewise in a part detail, in accordance with the illustration in FIG. 3.

This end position is shown in cross-section in FIGS. 3 and 4. FIG. 3 illustrates one design variant, in which the latching tongues 13 run in the direction which faces away from the brake pad 4 such that they are angled away with respect to the pad retaining spring 7. At their free end, in each case, the latching tongues 13 have outwardly directed offsets 15 which cover the associated edge regions of the window opening 9. In this way, the pad retaining clip 8 is secured in the upward direction.

For simplified introduction of the latching tongues 15, in each case one entry bevel 16 is provided on the associated walls of the window opening 9 on the underside of the pad retaining clip 8, which underside faces the brake pad 4, by way of which entry bevel 16 the latching tongues 13 are pressed together with deformation in the opposite direction to such an extent that simple passage of the window opening 9 is ensured.

In principle, the use of one latching tongue 13 is sufficient which is then arranged on that side of the pad retaining spring 7 which lies opposite the latching lug 10, in order thus to prevent a displacement in the direction of the latching lug 10. The width of the latching tongues 13 transversely with respect to the longitudinal extent of the pad retaining clip 8 corresponds approximately to the associated width of the window opening 9.

In the example which is shown in FIG. 4, the latching tongues 13 are a constituent part of the cover 17, by way of which the pad retaining spring 7 is held on the brake pad 4. The cover 17 is connected fixedly to the pad retaining spring 7.

Figure 5:
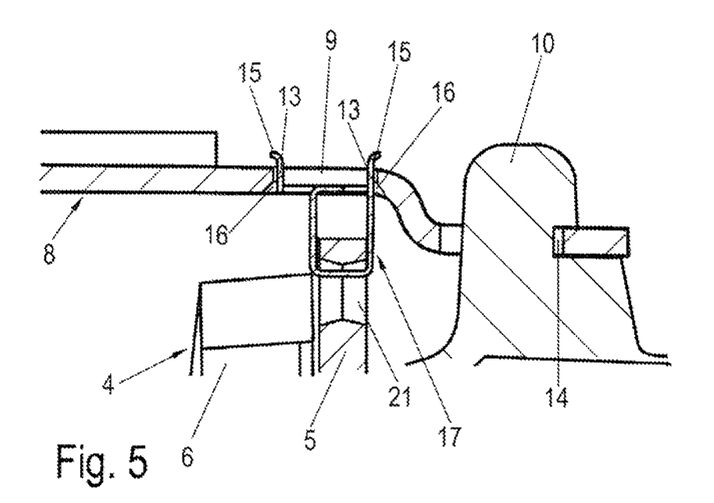
FIG. 5 shows a further exemplary embodiment of the invention, likewise in a part detail, in accordance with the illustration in FIG. 3.

In the example which is shown in FIG. 5, the cover 17 forms the positively locking element, to which end it is held in a slot 21 of the pad carrier plate. In this case, the use of the pad retaining spring 7 for the purpose of fastening the positively locking element can be dispensed with. Otherwise, the construction and the configuration of the cover 17 corresponds to that according to FIG. 4.

The positively locking connection of the pad retaining clip 8 to the pad retaining spring 7 is appropriate only on the reaction-side brake pad 4, since the opposite, application-side brake pad 3 can be displaced in a sliding caliper disk brake, whereas the reaction-side brake pad 4 remains in its position with respect to the brake caliper 1.

In order to remove the brake pads 3, 4, that is to say in order to release the pad retaining clip 8 in order to remove the brake pads 3, 4, the pad retaining spring 7 merely has to be pressed down in the direction of the brake pad 4 until the latching tongues 15 are moved out of the contact region with the window opening 9. Then, the pad retaining clip 8 can be displaced freely in the direction of the latching lug 10 and can be removed.

Figure 6:
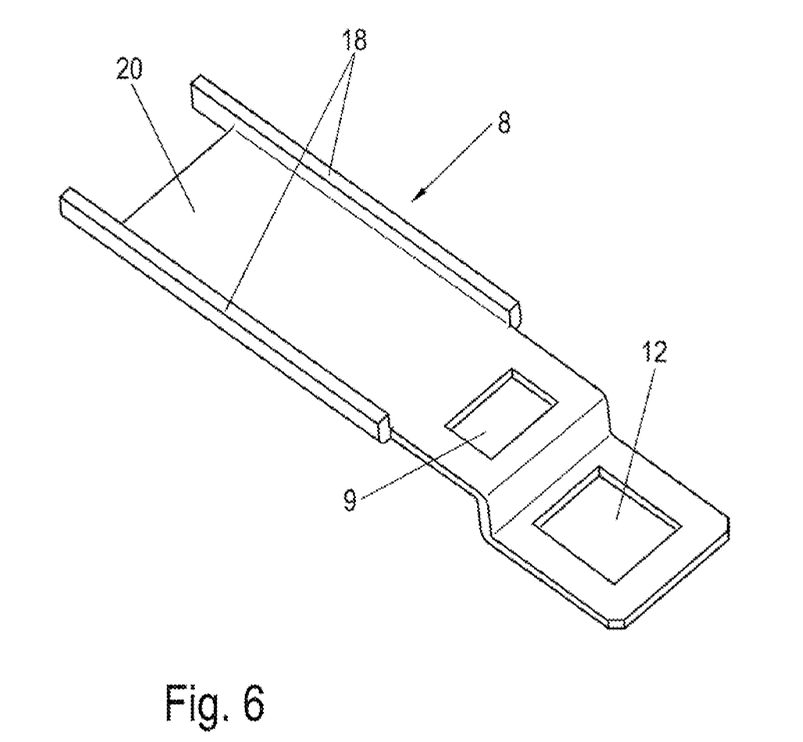
FIG. 6 shows a pad retaining clip according to an embodiment of the invention in a perspective view.

On both sides, the pad retaining clip 8 has ribs 18 which protrude beyond a bearing face 20 in the sense of fork prongs on an end side which lies opposite the aperture 12. The prongs form a lateral boundary for securing in the holder 11 in this region.

LIST OF DESIGNATIONS

1 Brake caliper
2 Brake disk
3 Brake pad
4 Brake pad
5 Pad carrier plate
6 Friction pad
7 Pad retaining spring
8 Pad retaining clip
9 Window opening
10 Latching lug
11 Holder
12 Aperture
13 Latching tongue
14 Undercut
15 Offset
16 Entry bevel
17 Cover
18 Rib
19 Assembly opening
20 Bearing face
21 Slot The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for securing two brake pads in a brake caliper of a disc brake having a brake disc, each brake pad being pressable against a respective side of the brake disc, the arrangement comprising:
a pad retaining clip held on the brake caliper and configured to span an assembly opening of the brake caliper through which the brake pads are assemblable;
a positively locking element arranged on at least one of the two brake pads, wherein
the pad retaining clip is secured against at least a longitudinal displacement by being fastened to the positively locking element of the at least one brake pad,
the positively locking element is attached to one of:
a pad retaining spring arranged on the brake pad, or
a pad carrier plate of the brake pad,
the pad retaining clip comprises a window opening, and
the positively locking element comprises at least one latching tongue configured to engage in the window opening of the pad retaining clip and bear against a wall of the window opening.

2. The arrangement according to claim 1, wherein the at least one brake pad comprises a friction pad fastened thereto.

3. The arrangement according to clip claim 1, wherein the positively locking element comprises two latching tongues arranged parallel to and spaced apart from one another, each of said tongues bearing against a respective wall of the window opening.

4. The arrangement according to claim 3, wherein
each latching tongue has an outwardly directed offset on a side facing away from the brake pad, the outwardly directed offset being configured to cover an upper edge of the window opening of the pad retaining clip.

5. The arrangement according to claim 1, further comprising:
a holder arranged on an application brake pad side of the brake caliper;
a latching lug arranged on a reaction brake pad side of the brake caliper, wherein
one end of the pad retaining clip is held in a slot of the holder, and
the other end of the pad retaining clip is held in an undercut of the latching lug of the brake caliper, the latching lug extending through an aperture of the pad retaining clip.

6. The arrangement according to claim 1, wherein the latching tongue is elastically deformable.

7. The arrangement according to claim 1, wherein
an entry bevel is provided in an edge region of the window opening on an underside of the pad retaining clip facing the brake pad.

8. The arrangement according to claim 1, wherein the positively locking element defines a cover by way of which the pad retaining spring is held on the brake pad.

9. A pad retaining clip for securing brake pads in a brake caliper having an assembly opening for the brake pads, the pad retaining clip comprising:
a longitudinal member configured to span the assembly opening of the brake caliper;
a window opening arranged in the longitudinal member at a location corresponding to the location of a reaction side brake pad assembled in the caliper when the pad retaining clip is operationally arranged on the caliper;
an aperture formed in the longitudinal member, the aperture being arranged at a location corresponding to a latching lug of the caliper; and
a positively locking element arranged on the brake pads, wherein
the positively locking element is attached to one of:
a pad retaining spring arranged on the brake pads, or
a pad carrier plate of the brake pads,
the pad retaining clip comprises a window opening, and
the positively locking element comprises at least one latching tongue configured to engage in the window opening of the pad retaining clip and bear against a wall of the window opening.

10. The pad retaining clip according to claim 9, wherein at least one edge of the window opening extending transversely with respect to a longitudinal extent of the longitudinal member is provided with an entry bevel on a side of the longitudinal member that faces the reaction side brake pad when installed.

11. The pad retaining clip according to claim 10, further comprising:
first and second ribs extending along respective longitudinal sides of the longitudinal member, the first and second ribs protruding beyond a bearing face of the longitudinal member of an end side lying opposite the aperture.

12. The pad retaining clip according to claim 9, wherein the positively locking element defines a cover by way of which the pad retaining spring is held on the brake pad.

13. A brake pad for a disc brake, comprising:
a pad carrier plate on which a friction pad is fastened; and
a positively locking element that is attached to one of:
- the pad carrier plate, or
- a pad retaining spring attached to the pad carrier plate,
  wherein
   the brake pad is held in place by a pad retaining clip having a window opening, and
   the positively locking element comprises at least one latching tongue configured to engage in the window opening of the pad retaining clip and bear against a wall of the window opening, and
   the latching tongue is elastically deformable transversely with respect to a longitudinal extent of the pad carrier plate.

14. The brake pad according to claim 13, wherein the positively locking element comprises two latching tongues arranged parallel to and spaced apart from one another.

15. The brake pad according to claim 14, wherein the two latching tongues are elastically deformable transversely with respect to a longitudinal extent of the pad carrier plate.

16. The brake pad according to claim 13, wherein the latching tongue comprises an offset arranged at an outwardly free edge side of the latching tongue.

17. The brake pad according to claim 13, wherein the positively locking element defines a cover by way of which the pad retaining spring is held on the brake pad.

* * * * *